United States Patent
Jaffe et al.

(10) Patent No.: US 9,560,437 B2
(45) Date of Patent: Jan. 31, 2017

(54) TIME HEURISTIC AUDIO CONTROL

(71) Applicant: Doppler Labs, Inc., New York, NY (US)

(72) Inventors: Matthew J. Jaffe, San Francisco, CA (US); Noah Kraft, New York, NY (US); Richard Fritz Lanman, III, San Francisco, CA (US); Jeff Baker, Newbury Park, CA (US)

(73) Assignee: Doppler Labs, Inc., San Francisco, CA (US)

( * ) Notice: Subject to any disclaimer, the term of this patent is extended or adjusted under 35 U.S.C. 154(b) by 0 days.

(21) Appl. No.: 14/928,996

(22) Filed: Oct. 30, 2015

(65) Prior Publication Data

US 2016/0057526 A1 Feb. 25, 2016

Related U.S. Application Data

(63) Continuation-in-part of application No. 14/681,843, filed on Apr. 8, 2015.

(Continued)

(51) Int. Cl.
 *A61F 11/06* (2006.01)
 *H04R 1/10* (2006.01)
 (Continued)

(52) U.S. Cl.
 CPC ......... *H04R 1/1083* (2013.01); *G10L 21/0208* (2013.01); *H04W 4/02* (2013.01);
 (Continued)

(58) Field of Classification Search
 CPC .......... G10L 21/0208; G10L 2021/02082; G10L 15/20; G10L 2015/223; G10L 2021/02166; G10L 25/03; G10L 25/51; H04R 1/1083; H04R 3/04; H04R 2225/55; H04R 2460/07; H04R 2420/07; H04R 1/1041; H04R 1/1091; H04R 1/1008; H04R 1/32; H04R 1/46; H04R 2460/13; H04R 29/00; H04R 3/12; H04R 3/00; H04R 3/005; H04R 5/033; H04R 5/04; G06F 3/165; G06F 3/011; G06F 3/167; G06F 17/30749; G06F 17/30761; G06F 17/30026; G06F 13/385; H04M 1/72558; H04M 1/72591; H04M 1/60; H04M 1/6058; H04M 1/6066; H04M 1/72527; H04S 1/007; H04S 1/005; H04S 7/301; H04S 7/303; H04N 21/4126

(Continued)

(56) References Cited

U.S. PATENT DOCUMENTS 5,566,237 A * 10/1996 Dobbs ................. H03G 5/025
 333/28 R
5,576,685 A * 11/1996 Saito ................... H04R 27/00
 340/328

(Continued)

FOREIGN PATENT DOCUMENTS

| EP | 2846328 | 10/2015 | |
|---|---|---|---|
| JP | WO 2013069556 A1 * | 5/2013 | ......... G10K 11/1788 |
| WO | 2013069556 A1 | 5/2015 | |

*Primary Examiner* — Leshui Zhang
(74) *Attorney, Agent, or Firm* — Van Pelt, Yi & James LLP

(57) ABSTRACT

A time heuristic audio control system, comprises a receiver for receiving time-based data from a personal computing device and a memory storing one or more sets processing parameters comprising instructions for processing the ambient sound based upon the time-based data. The system further includes a processor coupled to the memory and the receiver configured to adjust the ambient sound as directed by a selected set of processing parameters retrieved from the memory to create adjusted audio, the selected set of pro- (Continued)

cessing parameters retrieved based upon the time-based data and at least one speaker for outputting the adjusted audio.

25 Claims, 7 Drawing Sheets

Related U.S. Application Data

(60) Provisional application No. 61/976,794, filed on Apr. 8, 2014.

(51) Int. Cl.
*G10L 21/0208* (2013.01)
*H04W 4/02* (2009.01)
*H04W 4/00* (2009.01)
*H04R 27/00* (2006.01)

(52) U.S. Cl.
CPC ........ *H04R 27/00* (2013.01); *H04R 2227/003* (2013.01); *H04R 2460/07* (2013.01); *H04W 4/008* (2013.01)

(58) Field of Classification Search
USPC ............... 381/23.1, 92, 26, 56, 57, 60, 312, 313,381/314, 315, 317, 318, 320, 321, 61, 66, 72,381/74, 73.1, 86, 91, 93, 94.1, 94.2, 94.3, 94.4,381/94.7, 94.8, 94.9, 95, 96, 97, 98, 99, 100,381/101, 102, 103, 120, 121, 122, 71.1–71.14,381/334; 455/414.1, 414.2, 404.2, 404.1, 440, 455/422.1, 456.1, 456.2, 456.3, 456.4, 456.6, 455/457; 704/E19.013, E19.014, 704/E21.002–E21.009, E21.014; 379/406.01–406.16; 700/94
See application file for complete search history.

(56) References Cited

U.S. PATENT DOCUMENTS

| | | | |
|---|---|---|---|
| 5,604,812 A | 2/1997 | Meyer | |
| 6,868,162 B1 | 3/2005 | Jubien et al. | |
| 7,283,850 B2 | 10/2007 | Granovetter | |
| 7,391,877 B1 | 6/2008 | Brungart | |
| 8,306,204 B2 | 11/2012 | Erhart et al. | |
| 8,335,312 B2 | 12/2012 | Gerhardt et al. | |
| 8,649,540 B2 | 2/2014 | Killion et al. | |
| 8,718,291 B2 | 5/2014 | Alves et al. | |
| 8,750,544 B2 | 6/2014 | Killion et al. | |
| 9,253,560 B2 | 2/2016 | Goldstein et al. | |
| 2004/0052391 A1 | 3/2004 | Bren et al. | |
| 2008/0112569 A1 | 5/2008 | Asada | |
| 2008/0118078 A1 | 5/2008 | Asada et al. | |
| 2008/0181419 A1 | 7/2008 | Goldstein et al. | |
| 2010/0022269 A1 | 1/2010 | Terlizzi | |
| 2010/0033313 A1 | 2/2010 | Keady et al. | |
| 2010/0086137 A1 | 4/2010 | Nicolino et al. | |
| 2010/0146445 A1 | 6/2010 | Kraut | |
| 2010/0172510 A1 | 7/2010 | Juvonen | |
| 2011/0096933 A1 | 4/2011 | Eastty | |
| 2011/0103613 A1 | 5/2011 | Van Der Werf et al. | |
| 2011/0158420 A1 | 6/2011 | Hannah | |
| 2011/0188389 A1 | 8/2011 | Hedley et al. | |
| 2011/0222700 A1 | 9/2011 | Bhandari | |
| 2011/0228950 A1 | 9/2011 | Abrahamsson et al. | |
| 2011/0243344 A1 | 10/2011 | Bakalos et al. | |
| 2013/0208909 A1 | 8/2013 | Mulder | |
| 2013/0236040 A1 | 9/2013 | Crawford et al. | |
| 2014/0044269 A1 | 2/2014 | Anderson | |
| 2014/0046659 A1 | 2/2014 | Burton et al. | |
| 2014/0105412 A1 | 4/2014 | Alves et al. | |
| 2014/0185828 A1 | 7/2014 | Helbling | |
| 2014/0198926 A1 | 7/2014 | Killion et al. | |
| 2014/0211972 A1 | 7/2014 | Kim et al. | |
| 2014/0221017 A1 | 8/2014 | Jensen et al. | |
| 2014/0277650 A1 | 9/2014 | Zurek et al. | |
| 2014/0314245 A1* | 10/2014 | Asada | G10K 11/1788 381/71.6 |
| 2014/0314261 A1 | 10/2014 | Selig et al. | |
| 2014/0321660 A1 | 10/2014 | Harsch | |
| 2014/0334644 A1 | 11/2014 | Selig et al. | |
| 2015/0003652 A1* | 1/2015 | Bisgaard | H04R 25/50 381/314 |
| 2015/0063575 A1 | 3/2015 | Tan | |
| 2015/0190284 A1 | 7/2015 | Censo et al. | |
| 2016/0259619 A1 | 9/2016 | Appell et al. | |

* cited by examiner

000

TIME HEURISTIC AUDIO CONTROL

RELATED APPLICATION INFORMATION

This patent is a continuation-in-part of co-pending patent application Ser. No. 14/681,843, entitled "Active Acoustic Filter with Location-Based Filter Characteristics," filed Apr. 8, 2015, which claims priority from provisional patent application 61/976,794, entitled "Digital Acoustical Filters for Use in Human Ears and Method for Using Same", filed Apr. 8, 2014, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates generally to a system for time heuristic audio control. In particular, this disclosure relates to the adjustment of ambient and secondary audio sources using time-based data.

Description of the Related Art

Audio equalization systems have existed for some time. Through these systems, users of personal audio devices such as Sony® Walkman® or the Apple® iPod® have been able to adjust the relative volume of frequencies in pre-recorded audio as desired. Similarly, these devices have often employed pre-set memories that enable users to store preferred equalization settings or manufacturer-set pre-set settings that may have names, such as "bass boost" or "symphony" or "super-treble" dependent upon their particular parameters. Whatever the case, users have been required to either set the settings and/or store them for later use, or to select from a group of previously-stored settings as desired.

In a related field, active and passive noise cancellation to remove undesirable traits of ambient audio and personal pre-recorded audio have existed for some time. For example, Bose® noise cancelling headphones are known for removing virtually all ambient sound within desired frequency range from an environment (e.g. airplane noise while an individual is flying in an airplane). Simultaneously, these types of systems may include the capability to output audio, such as pre-recorded audio, through one or more speakers. However, these systems typically are all-or-nothing systems in which all external sound is effectively cancelled or attenuated and any pre-recorded audio is output as-is. Thus, the noise-cancelling properties are typically "enabled" or "not enabled."

Figure 1:
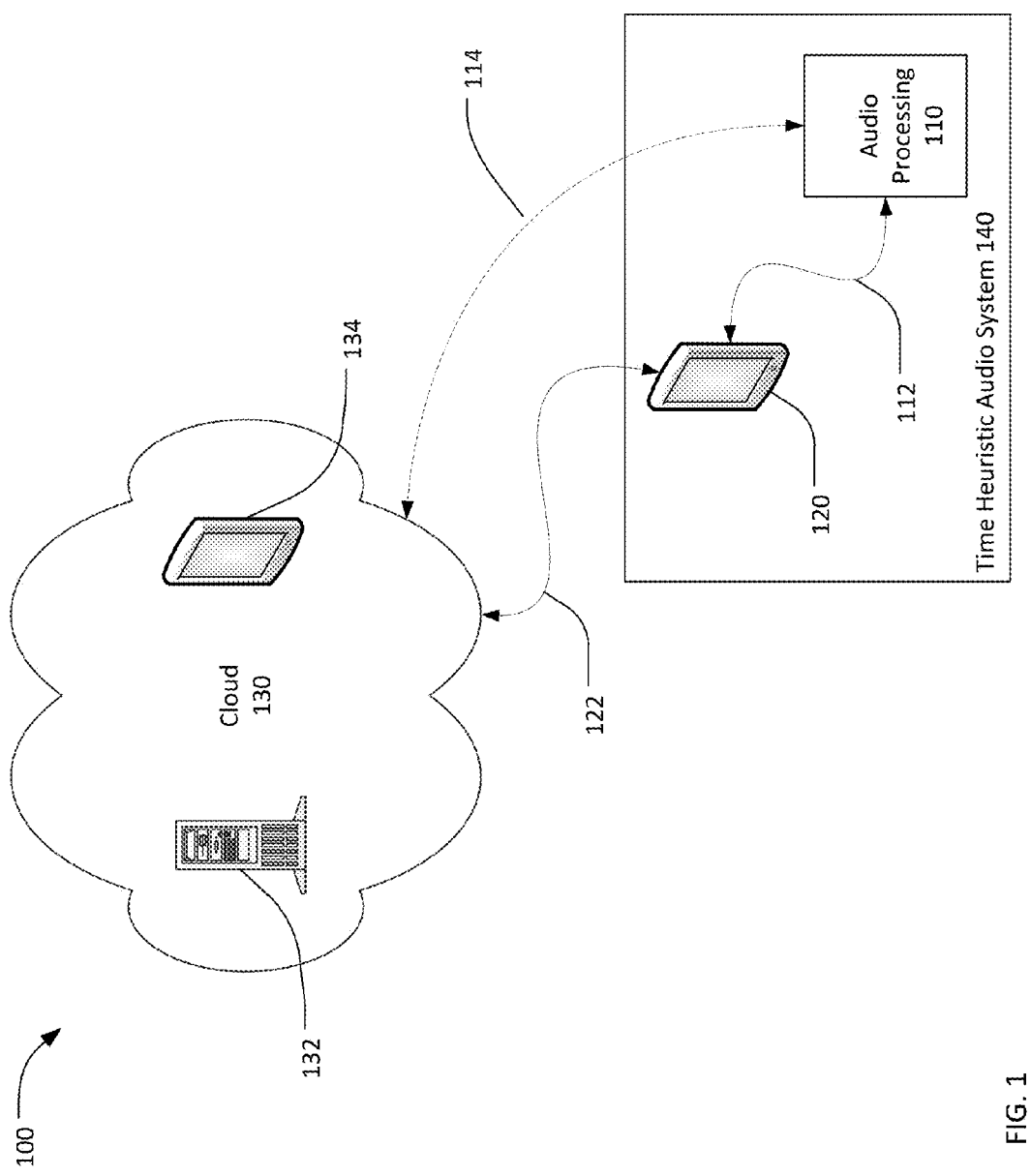
FIG. 1 is a block diagram of an environment.

Throughout this description, elements appearing in figures are assigned three-digit reference designators, where the most significant digit is the figure number where the element is introduced and the two least significant digits are specific to the element. An element not described in conjunction with a figure has the same characteristics and function as a previously-described element having the same reference designator.

DETAILED DESCRIPTION

An individual may wish to pre-define, either through overt action, or preferably, through machine-learning principles, a set of audio processing parameters that are to be used when the individual is known to be at a particular event, location, or environment. For example, when attending a series of concerts at a particular venue, a user may repeatedly select one predetermined set of audio processing parameters. These parameters may, for example, adjust equalization settings, introduce a reverb and perform active noise cancellation on aspects of sound while not eliminating others (e.g. eliminating human voices while not eliminating any other ambient sound). After a user has selected those same settings several times when in the particular venue, those settings may be stored as an automatically-selected set of processing parameters when calendar data in the individual's personal computing device (e.g. an iPhone®) indicates that the user is at that same concert venue. On the next visit to that location, based upon time-based data like calendar data, the same set of processing parameters may be selected automatically.

As used herein, the phrases "ambient sound" or "ambient audio" mean sound in the physical location where a user of the time heuristic audio control system is present. Ambient sound is further audio that may be heard, either by the user's ears in that physical location or while in that physical location with the aid of audio-enhancing technologies. Ambient sound is distinguished from "secondary audio" or "secondary sound" in that secondary sound and secondary audio as used herein means audio that is not audible in the physical location where the user of the combined ambient and secondary audio system is present either by humans or by the aid of audio-enhancing technologies. Secondary audio can come from many different types of sources, but it is distinctly not in the present physical environment audible to a user of the system. Both ambient sound and secondary audio may be limited to applications for in-ear earbuds or over-the-ear headphones that would, without the reproduction of ambient sound by speakers within the system, otherwise significantly reduce or virtually eliminate ambient sound.

As used herein "time-based data" means data that is dependent upon or derived from the present, a past, or a future time. Calendar entries such as appointments, meetings, and previously-scheduled events are examples of time-based data. Similarly, "time-based data" may be obtained from other sources such as text messages, simple message service messages, instant messaging services, group messaging services, email, and other text-based communications such that, for example, data indicating a plan to meet at a particular location at a pre-determined time may comprise "time-based data."

Similarly, data attached to any one of these formats may also be time-based data. For example, an email may include as an attachment e-tickets or tickets in PDF (portable document format) form to an event at a concert venue with date and time information appearing on the face of the tickets. This date and time information is time-based data. Time-based data may also simply be the present time as determined by a clock. In situations in which a user habitually performs an action at a known time every weekday or every third Tuesday or other similarly-predictable interval, the present time, noted over the course of multiple occurrences may act as time-based data. Location data, such as GPS (global positioning system) data, or assisted GPS data is specifically excluded from the meaning of "time-based data" as used herein.

Description of Apparatus

Referring now to FIG. 1, an environment 100 may include a cloud 130 and a time heuristic audio system 140. In this context, the term "cloud" means a network and all devices that may be accessed by the time heuristic audio system 140 via the network. The cloud 130 may be a local area network, wide area network, a virtual network, or some other form of network together with all devices connected to the network. The cloud 130 may be or include the Internet. The devices within the cloud 130 may include one or more servers 132 and one or more personal computing devices 134.

The time heuristic audio system 140 includes an audio processing system 110 and a personal computing device 120. While the personal computing device 120 is shown in FIG. 1 as a smart phone, the personal computing device 120 may be a smart phone, a desktop computer, a mobile computer, a wrist-computer, smartwatch, smartwatch-like device, a tablet computer, or any other computing device that is capable of performing the processes described herein. In some cases, some or all of the personal computing device 120 may incorporated within the audio processing system 110 or some or all of the audio processing system 110 may be incorporated into the personal computing device.

The personal computing device 120 may include one or more processors and memory configured to execute stored software instructions to perform the processes described herein. For example, the personal computing device 120 may run an application program or "app" to perform some or all of the functions described herein. The personal computing device 120 may include a user interface comprising a display and at least one input device such as a touch screen, microphone, keyboard, and/or mouse. The personal computing device 120 may be configured to perform geo-location, which is to say to determine its own location and to thereby generate location data. Geo-location may be performed, for example, using a Global Positioning System (GPS) receiver or by some other method.

The audio processing system 110 may communicate with the personal computing device 120 via a first wireless communications link 112. The first wireless communications link 112 may use a limited-range wireless communications protocol such as Bluetooth®, Wi-Fi®, ZigBee®, or some other wireless Personal Area Network (PAN) protocol. The personal computing device 120 may communicate with the cloud 130 via a second communications link 122. The second communications link 122 may be a wired connection or may be a wireless communications link using, for example, the WiFi® wireless communications protocol, a mobile telephone data protocol, or another wireless communications protocol.

Optionally, the audio processing system 110 may communicate directly with the cloud 130 via a third wireless communications link 114. The third wireless communications link 114 may be an alternative to, or in addition to, the first wireless communications link 112. The third wireless connection 114 may use, for example, the WiFi® wireless communications protocol, Bluetooth® or another wireless communications protocol. Still further, the audio processing system 110 may communicate with the cloud 130 through the second communications link 122 of the personal computing device 120 and the first communications link 112.

Figure 2:
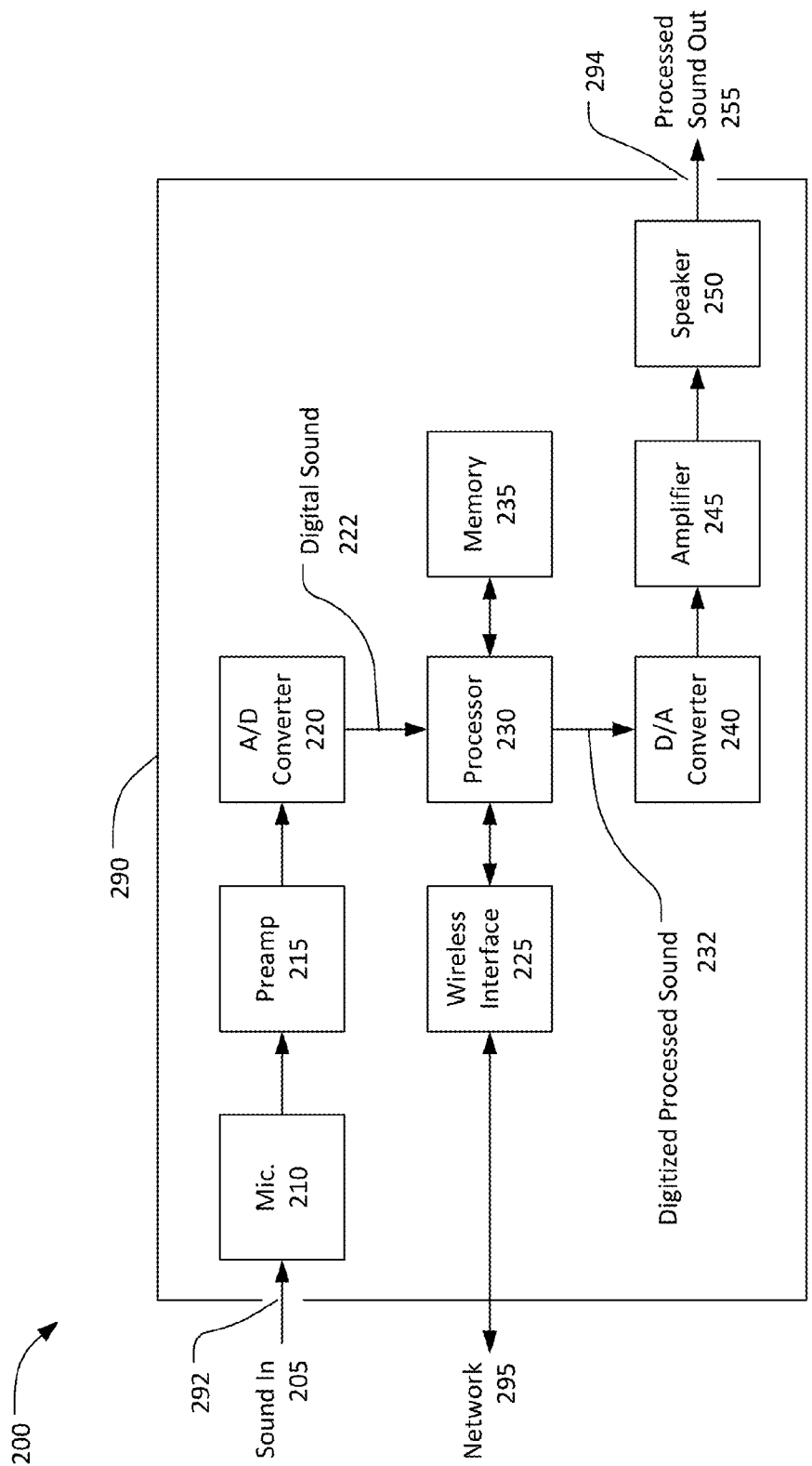
FIG. 2 is block diagram of an audio processing system.

FIG. 2 is block diagram of an audio processing system 200. This may be the audio processing system 110 of FIG. 1. The audio processing system 200 may include a microphone 210, a preamplifier 215, an analog-to-digital (A/D) converter 220, a wireless interface 225, a processor 230, a memory 235, an analog signal by digital-to-analog (D/A) converter 240, and amplifier 245, a speaker 250, and a battery (not shown), all of which may be contained within a housing 290. Some or all of the microphone 210, the preamplifier 215, the analog-to-digital (A/D) converter 220, the wireless interface 225, the processor 230, the memory 235, the analog signal by digital-to-analog (D/A) converter 240, and the amplifier 245, a speaker 250 elements may be integrated into one or more integrated microchips or systems-on-chips.

The housing 290 may be configured to interface with a user's ear by fitting in, on, or over the user's ear such that ambient sound is mostly excluded from reaching the user's ear canal and processed sound generated by the audio processing system 200 is coupled into the user's ear canal. The housing 290 may have a first aperture 292 for accepting ambient sound and a second aperture 294 to allow processed sound to be output into the user's outer ear canal.

The housing 290 may be, for example, an earbud housing. The term "earbud" means an apparatus configured to fit, at least partially, within and be supported by a user's ear. An earbud housing typically has a portion that fits within or against the user's outer ear canal. An earbud housing may have other portions that fit within the concha or pinna of the user's ear.

The microphone 210 converts received sound 205 (e.g. ambient sound) into an electrical signal that is amplified by preamplifier 215 and converted into digital sound 222 by A/D converter 220. The digital sound 222 may be processed by processor 230 to provide digitized processed sound 232. The processing performed by the processor 230 will be discussed in more detail subsequently. The digitized processed sound 232 is converted into an analog signal by D/A converter 240. The analog signal output from D/A converter 240 is amplified by amplifier 245 and converted into processed output sound 255 by speaker 250.

The depiction in FIG. 2 of the audio processing system 200 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the analog-to-digital (A/D) converter 220, the wireless interface 225, the processor 230, the memory 235, the analog signal by digital-to-analog (D/A) converter 240, and the amplifier 245 may be contained within a common signal processor circuit device.

The microphone 210 may be one or more transducers for converting sound into an electrical signal that is sufficiently compact for use within the housing 290.

The preamplifier 215 may be configured to amplify the electrical signal output from the microphone 210 to a level compatible with the input of the A/D converter 220. The preamplifier 215 may be integrated into the A/D converter 220, which, in turn, may be integrated with the processor 230. In the situation where the audio processing system 200 contains more than one microphone, a separate preamplifier may be provided for each microphone.

The A/D converter 220 may digitize the output from preamplifier 215, which is to say convert the output from preamplifier 215 into a series of digital ambient sound samples at a rate at least twice the highest frequency present in the ambient sound. For example, the A/D converter may output digital sound 222 in the form of sequential sound samples at rate of 40 kHz or higher. The resolution of the digitized sound 222 (i.e. the number of bits in each sound sample) may be sufficient to minimize or avoid audible sampling noise in the processed output sound 255. For example, the A/D converter 220 may output digitized sound 222 having 12 bits, 14, bits, or even higher resolution. In the situation where the audio processing system 200 contains more than one microphone with respective preamplifiers, the outputs from the preamplifiers may be digitized separately, or the outputs of some or all of the preamplifiers may be combined prior to digitization.

The wireless interface 225 may provide the audio processing system 200 with a connection to one or more wireless networks 295 using a limited-range wireless communications protocol such as Bluetooth®, Wi-Fi®, ZigBee®, or other wireless personal area network protocol. The wireless interface 225 may be used to receive data such as parameters for use by the processor 230 in processing the digital ambient sound 222 to produce the digitized processed sound 232. The wireless interface 225 may be used to receive digital sound, such as audio from a secondary audio source. Alternatively, a hardware interface such as an audio input jack of various known types (not shown) may enable input of digital secondary audio to the processor 230. The wireless interface 225 may also be used to export the digitized processed sound 232, which is to say transmit the digitized processed sound 232 to a device external to the ambient audio processing system 200. The external device may then, for example, store and/or publish the digitized processed sound, for example via social media.

The processor 230 may include one or more processor devices such as a microcontroller, a microprocessor, and/or a digital signal processor. The processor 230 can include and/or be coupled to the memory 235. The memory 235 may store software programs, which may include an operating system, for execution by the processor 230. The memory 235 may also store data for use by the processor 230. The data stored in the memory 235 may include, for example, digital sound samples and intermediate results of processes performed on the digital ambient sound 222. The data stored in the memory 235 may also include a user's listening preferences, and/or rules and parameters for applying particular processes to convert the digital sound 222 into the digitized processed sound 232 prior to output. The memory 235 may include a combination of read-only memory, flash memory, and static or dynamic random access memory.

The D/A converter 240 may convert the digitized processed sound 232 from the processor 230 into an analog signal. The processor 230 may output the digitized processed sound 232 as a series of samples typically, but not necessarily, at the same rate as the digital sound 222 is generated by the A/D converter 220. The analog signal output from the D/A converter 240 may be amplified by the amplifier 245 and converted into processed output sound 255 by the speaker 250. The amplifier 245 may be integrated into the D/A converter 240, which, in turn, may be integrated with the processor 230. The speaker 250 can be any transducer for converting an electrical signal into sound that is suitably sized for use within the housing 290.

The battery (not shown) may provide power to various elements of the audio processing system 200. The battery may be, for example, a zinc-air battery, a lithium ion battery, a lithium polymer battery, a nickel cadmium battery, or a battery using some other technology.

Figure 3:
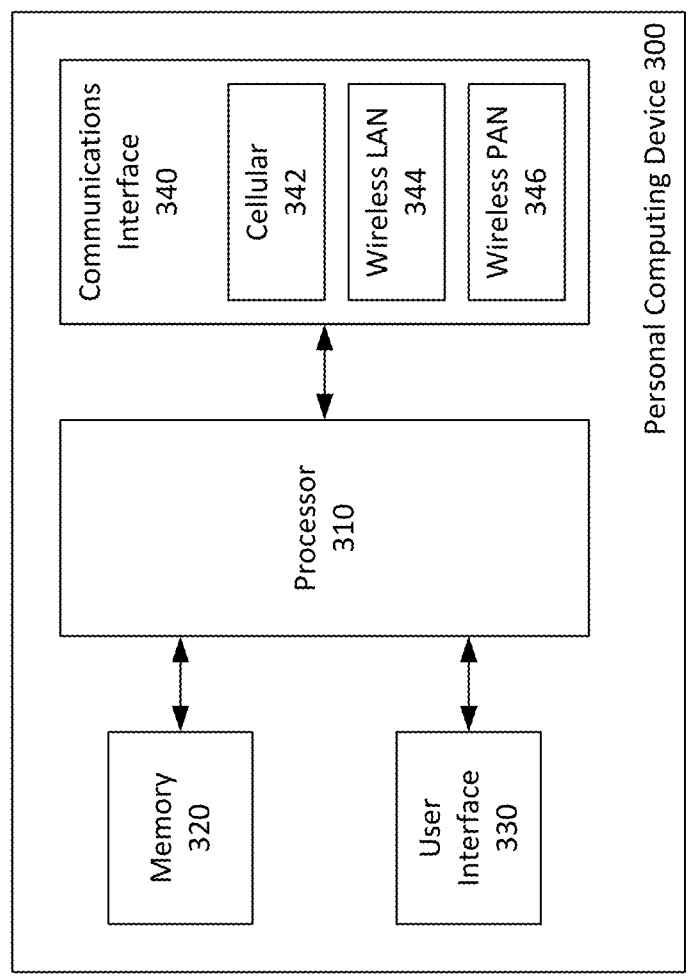
FIG. 3 is a block diagram of a personal computing device.

FIG. 3 is a block diagram of an exemplary personal computing device 300 which may be suitable for the personal computing device 120 within the time heuristic audio system 140. As shown in FIG. 3, the personal computing device 300 includes a processor 310, memory 320, a user interface 330, and a communications interface 340. Some of these elements may or may not be present, depending on the implementation. Further, although these elements are shown independently of one another, each may, in some cases, be integrated into another.

The processor 310 may be or include one or more microprocessors, microcontrollers, digital signal processors, application specific integrated circuits (ASICs), or a system-on-a-chip (SOCs). The memory 320 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The communications interface 340 includes at least one interface for wireless communications with external devices. The communications interface 340 may include one or more of a cellular telephone network interface 342, a wireless Local Area Network (LAN) interface 344, and/or a wireless PAN interface 346. The cellular telephone network interface 342 may use one or more of the known 2G, 3G, and 4G cellular data protocols. The wireless LAN interface 344 may use the WiFi® wireless communications protocol or another wireless local area network protocol. The wireless PAN interface 346 may use a limited-range wireless communications protocol such as Bluetooth®, Wi-Fi®, ZigBee®, or some other wireless personal area network protocol. When the personal computing device is deployed as part of a time heuristic audio system, such as the time heuristic audio system 140, the wireless PAN interface 346 may be used to communicate with one or more audio processing systems 110. The cellular telephone network interface 342 and/or the wireless LAN interface 344 may be used to communicate with the cloud 130.

The communications interface 340 may include radio-frequency circuits, analog circuits, digital circuits, one or more antennas, and other hardware, firmware, and software necessary for communicating with external devices, such as an audio processing system 110. The communications interface 340 may include one or more processors to perform functions such as coding/decoding, compression/decompression, and encryption/decryption as necessary for communicating with external devices using selected communications protocols. The communications interface 340 may rely on the processor 310 to perform some or all of these function in whole or in part.

The memory 320 may store software programs and routines for execution by the processor. These stored software programs may include an operating system such as the Apple® iOS or Android® operating systems. The operating system may include functions to support the communications interface 340, such as protocol stacks, coding/decoding, compression/decompression, and encryption/decryption. The stored software programs may include an application or "app" to cause the personal computing device to perform portions of the processes and functions described herein.

The user interface 330 may include a display and one or more input devices including a touch screen.

Figure 4:
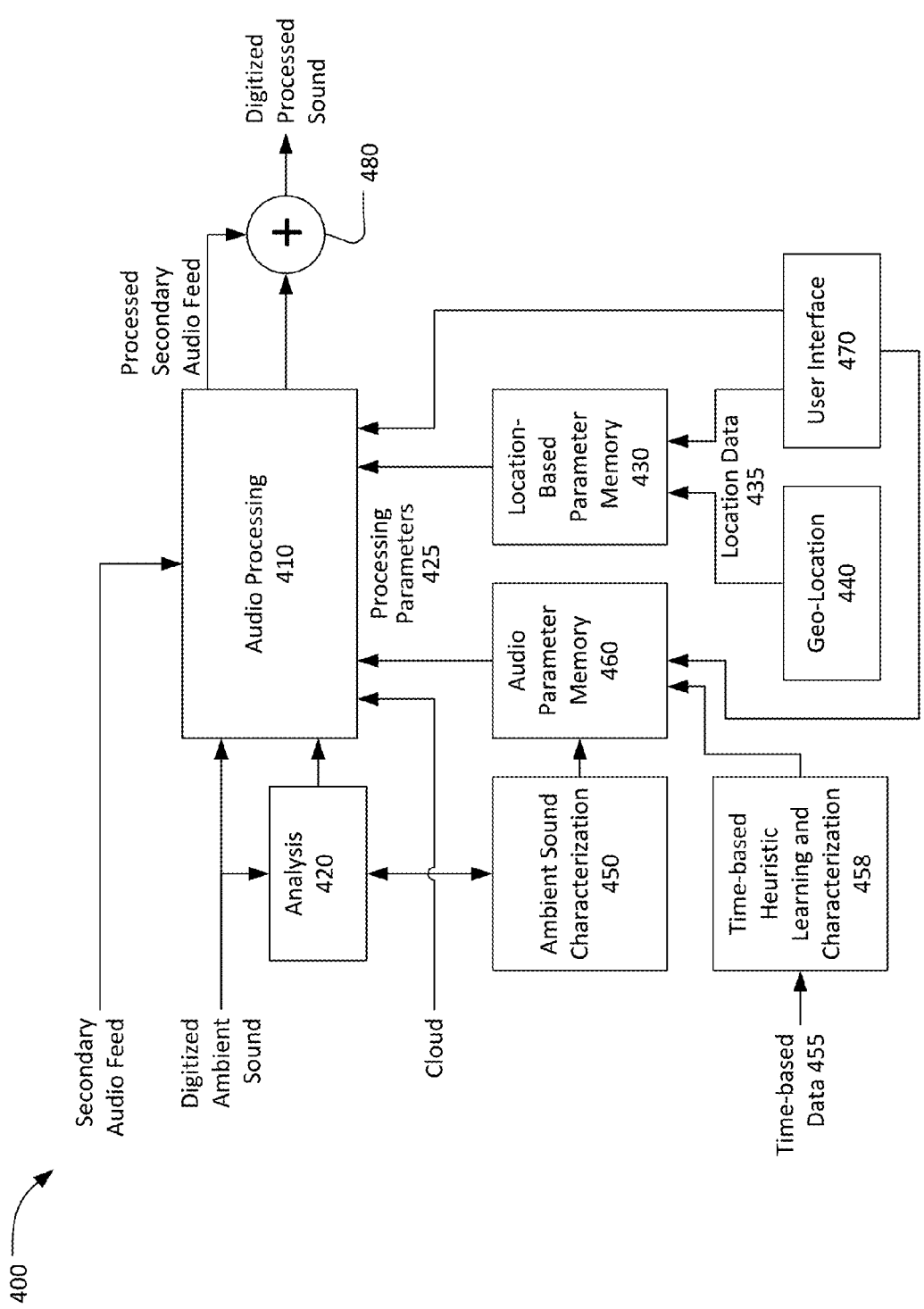
FIG. 4 is a functional block diagram of a portion of a time heuristic audio system.

FIG. 4 shows a functional block diagram of a portion of a time heuristic audio system 400, which may be the system 140. Some or all of elements of the functional block diagram may be encompassed within the audio processing system 110 or within the personal computing device 120. That is to say, the functions and processing described with reference to FIG. 4 may take place in whole or in part in one or both of these devices, with the final sound being delivered to one or more speakers within the audio processing system 110.

In the system 400, digitized ambient sound may be received, for example, from an A/D converter such as the A/D converter 220. The digitized ambient sound is processed by an audio processing function 410 implemented by a processor such as the processor 230. The processor performing the audio processing function may include one or more processor devices such as a microcontroller, a microprocessor, and/or a digital signal processor. The audio processing function 410 may include filtering, equalization, compression, limiting, and other processes. Filtering may include high-pass, low-pass, band-pass, and band-reject filtering. Equalization may include dividing the ambient sound into a plurality of frequency bands and subjecting each of the bands to a respective attenuation or gain. Equalization may be combined with filtering, such as a narrow band-reject filter to suppress a particular objectionable component of the ambient sound. Compression may be used to alter the dynamic range of the ambient sound such that louder sounds are attenuated more than softer sounds. Compression may be combined with filtering or with equalization such that louder frequency bands are attenuated more than softer frequency bands. Limiting may be used to attenuate louder sounds to a predetermined loudness level without attenuating softer sounds. Limiting may be combined with filtering or with equalization such that louder frequency bands are attenuated to a defined level while softer frequency bands are not attenuated or attenuated by a smaller amount. Techniques for implementing filters, compressors, and limiters are known to those of skill in the art of digital signal processing.

The audio processing function 410 may also include adding echo or reverberation to the ambient sound. The audio processing function 410 may also include detecting and cancelling an echo in the ambient sound. The audio processing function 410 may further include noise reduction processing. Techniques to add or suppress echo, to add reverberation, and to reduce noise are known to those of skill in the art of digital signal processing. The audio processing function 410 may include music effects such as chorus, pitch shifting, flanging, and/or "vinyl" emulation (adding scratches and pops to emulation vinyl records). Techniques to add these music effects are known to those of skill in the art of digital signal processing.

The audio processing function 410 may be performed in accordance with processing parameters 425 provided from audio parameter memory 460 and location based parameter memory 430. Multiple processing parameters 425 may be created and stored in the audio parameter memory 460.

The processing parameters 425 may define the type and degree of one or more processes to be performed on the digitized ambient sound or upon any secondary audio feed. For example, the processing parameters 425 may define filtering by a low pass filter with a particular cut-off frequency (the frequency at which the filter start to attenuate) and slope (the rate of change of attenuation with frequency) and/or compression using a particular function (e.g. logarithmic). For further example, the processing parameters 425 may define the way in which a secondary audio feed is overlaid or combined with the digitized ambient sound. The number and format of the processing parameters 425 may vary depending on the type of audio processing to be performed.

The audio processing function 410 may be defined, in part, based on analysis of the ambient sound by an analysis function 420, which may be implemented by the same processor, or a different processor, as the audio processing function 410. The analysis function 420 may analyze the digitized ambient sound to determine, for example, an overall (i.e. across the entire audible frequency spectrum) loudness level or the loudness level within particular frequency bands. For further example, the analysis function 420 may transform the digitized ambient sound and/or the digitized sound output from the audio processing function 410 into the frequency domain using, for example, a windowed Fourier transform. The transformed sound may then be analyzed to determine the distribution of the ambient sound within the audible frequency spectrum and/or to detect the presence of dominant sounds at particular frequencies. The analysis function 420 may perform other analysis to determine other characteristics of the digitized ambient sound.

A portion of the processing parameters 425 for the audio processing function 410 may define processes dependent on the analysis of the ambient sound. For example, a first processing parameter may require that the overall loudness of the processed sound output from the time heuristic audio system 400 be less than a predetermined value. The analysis function 420 may determine the overall loudness of the ambient sound and the audio processing function 410 may than provide an appropriate amount of overall attenuation The processing parameters 425 may be received or retrieved from several sources. The processing parameters 425 may be received from a user of the time heuristic audio system 400. The user may manually enter processing parameters via a user interface 470, which may be the user interface of a personal computing device such as the personal computing device 120. Alternatively, a microphone accessible to the audio processing function 410 (such as mic 210) or a microphone (not shown) in portable computing device 300 may provide input that is used in conjunction with the audio processing function 410 and other processing parameters 425 to adjust the time heuristic audio system 400.

The processing parameters 425 may be received from a device or devices available via a computer network or otherwise available within the cloud 130. For example, a website accessible via the cloud 130 may list recommended sets of processing parameters for different venues, bands, sporting events, and the like. These processing parameters 425 may be generated, in part, based upon feedback regarding the ambient sound from multiple time heuristic audio systems like time heuristic audio system 140 in communication with one another using the cloud 130. Similarly, a setting change on one of a group of interconnected ambient and secondary audio systems may be propagated to all.

The processing parameters 425 may be, at least in part, location-based, which is to say the processing parameters 425 may be associated with a current location of the time heuristic audio system 400 as determined based upon location data 435 received, for example, from a GPS. The current location may be a specific location (e.g. "user's living room", "user's office", "Fenway Park", "Chicago O'Hare Airport", etc.) or a generic location (e.g. "sporting event", "dance club", "concert", "airplane", etc.). A location-based parameter memory 430 may store one or more sets of location-based processing parameters in association with data defining respective locations. The appropriate processing parameters may be retrieved from location-based parameter memory 430 based on location data 435 identifying the current location of the time heuristic audio system 400.

The location data 435 may be provided by a geo-location function 440. The geo-location function may use GPS, cell tower signal strength, a series of relative-location calculations based upon interconnected time heuristic audio systems 140 or some other technique for identifying the current location. The location data 435 may be provided by the user via the user interface 470. For example, the user may select a location from a list of locations for which processing parameters are stored in the location-based parameter memory 430. The location data 435, particularly for a generic location, may be retrieved from a cloud external to the time heuristic audio system 400. The location data 435 may obtained by some other technique.

The one or more sets of location-based processing parameters may have been stored in the location-based parameter memory 430 during prior visits to the corresponding locations. For example, the user of the time heuristic audio system 400 may manually set processing parameters for their home and save the processing parameters in the location-based parameter memory 430 in association with the location "home". Similarly, the user may set and save processing parameters for other locations (e.g. "work", "patrol", etc.). Upon returning to these locations (or to locations defined in the negative (not "home", not "work", etc.), the corresponding processing parameters may be automatically retrieved from the location-based parameter memory 430.

The processing parameters 425 may be based, at least in part, upon ambient sound, which is to say the processing parameters 425 may be associated with particular characteristics of the ambient sound. The time heuristic audio system 400 may "listen" to the ambient sound and learn what filter parameters the user sets in the presence of various ambient sound characteristics. Once the ambient sound has been characterized, the time heuristic audio system 400 may select or suggest processing parameters 425 appropriate for the characteristics of the current ambient sound.

For example, an audio parameter memory 460 may store one or more audio sound profiles identifying respective sets of processing parameters 425 to be applied to ambient audio as those processing parameters 425 have been previously defined by the user, by a manufacturer, by a supervisor, or by an organization of which a wearer is a member for use in a particular environment or situation. Each stored audio sound profile may include characteristics such as, for example, frequencies to attenuate or increase in volume, instructions to emphasize sounds that already stand out from the overall ambient sound environment (e.g. gunshots, footsteps, dogs barking, human voices, whispers, etc.) while deemphasizing (e.g. decreasing the overall volume) other ambient sounds, elements of sound to emphasize, aspects to superimpose over ambient audio or identifications of databases and algorithms from which to draw audio for superimposition over ambient audio, locational feedback algorithms for emphasizing locations of certain sounds or frequency ranges, sources of live audio to superimpose over ambient sound or other, similar profiles.

An ambient sound characterization function 450, which may work in conjunction with or in parallel to the analysis function 420, may develop an ambient sound profile of the current ambient sound. The profile determined by the ambient sound characterization function 450 may be used to retrieve an appropriate sound profile, including the associated processing parameters 425 from the audio parameter memory 460. This retrieval may rely in part upon the location data 435 and location-based parameter member 430. These stored ambient sound profiles and processing parameters 425 may direct the system 140 to operate upon ambient sound and/or secondary audio sources in a particular fashion.

The one or more sets of processing parameters 425 making up one or more audio sound profiles may have been stored in the audio parameter memory 460 during prior exposure to ambient sound having particular profiles. The processing parameters 425 may direct the way in which ambient sound and secondary audio are treated by the time heuristic audio system 400. These settings may be across-the-board settings such as overall maximum or minimum volume or may be per-audio-source settings such that ambient audio has reverb added, while secondary audio is clean. Similarly, ambient and/or secondary audio may be "spatialized" (made to sound as though they are present at a particular location or distance from the hearer) based upon these processing parameters 425. More detail is provided below.

For example, the user of the time heuristic audio system 400 may manually set processing parameters 425 during a visit to a dance club. These processing parameters 425 may be saved in the audio parameter memory 460 in association with the profile of the ambient sound in the dance club. The processing parameters 425 may be saved in the audio parameter memory 430 in response to a user action, or may be automatically "learned" by the active time heuristic audio system 400. Upon encountering similar ambient audio, the appropriate processing parameters 425 may be automatically retrieved from the audio parameter memory 460.

This heuristic learning process may take place based upon time-based data 455 received by a time-based heuristic learning and characterization function 458. The time-based data may be provided from a calendar, an email, or a text-based source available to a personal computing device 120, when compared with a clock, for example a clock of the personal computing device 120. The time-based data 455 may take the form of a calendar event indicating that a user is present at a particular location, event, or premises. The time-based data 455 may be used by the time-based heuristic learning and characterization function 458 in one of two ways.

First, the time-based heuristic learning and characterization function 458 may make a determination whether the user is present at a particular location, event, or premises based upon the present time or available sources of the user's current location, event, or premises. The time-based heuristic learning and characterization function 458 may, if the user has manually altered the processing parameters 425 of the audio processing function 410, take note of the current time, the associated current location, event, or premises in the audio parameter memory 460. In this way, if the user makes the same manual alteration to the processing parameters 425 more than a threshold number of times, the audio parameter memory may be updated to reflect that those processing parameters 425 are to be used each time the time-based data 455 indicates that the time has changed to the associated time or that the user is present in the location, event, or premises.

Second, the time-based heuristic learning and characterization function 458 may access the present time from, for example, a personal computing device 120 clock, or may access one or more data repositories for a user's present location, event attendance, or premises presence periodically or as a user changes locations. Based upon this time-based data 455, the audio processing function 410 may store instructions—user input or learned heuristically—to use a particular set of processing parameters 425. In this way, the time-based heuristic learning and characterization function 458 may "learn" relevant times and places which, based upon time-based data, may be used to automatically select audio processing parameters 425 for ambient sound and/or secondary audio.

Although location data is distinct from the time-based data 455, the heuristic learning and characterization function 458 may also "learn" or rely upon the geo-location function 440 or location data 435 to select a particular set of processing parameters 425. Specifically, the function 458 may rely upon all available data including both time-based data 455 and location data 435 when making determinations of locations of individuals. Nonetheless, these two types of data are expressly distinct from one another as used herein.

While FIG. 4 depicts the audio parameter memory 460 and the location-based parameter memory 430 separately, these may be a common memory that associates each stored set of processing parameters 425 with a location, with an ambient sound profile, or both. Thus, one or both of audio parameters and location-based parameters may be taken into account when selecting or suggesting processing parameters 425 for a time heuristic audio system 400.

An adder 480 may add a secondary audio feed to the output from the audio processing function 410 to produce the digitized processed sound. The secondary audio feed may be received by the time heuristic audio system 400 from an external source via a wireless communications link and the secondary audio may be processed by the audio processing function 410 before being added to the ambient sound. For example, a user at a sporting event may receive a secondary audio feed of a sportscaster describing the event, which is then superimposed on the processed ambient sound of the event itself. This superimposition of secondary audio may be, in part, controlled by time-based data 455 (e.g. tickets to a sporting event stored in a user's email account) indicating that the user is present or plans to be present at the sporting event.

The depiction in FIG. 4 of the time heuristic audio system 400 as a set of functional blocks or elements does not imply any corresponding physical separation or demarcation. All or portions of one or more functional elements may be located within a common circuit device or module. Any of the functional elements may be divided between two or more circuit devices or modules. For example, all or portions of the audio processing function 410, the analysis function 420, and the adder 480 may be implemented within a time heuristic audio system packaged within an earbud or other housing configured to interface with a user's ear. The ambient sound characterization function 450, the audio parameter memory 460 and the location-based parameter memory 430 may be distributed between time heuristic audio system and a personal computing device coupled to the time heuristic audio system by a wireless communications link.

Figure 5:
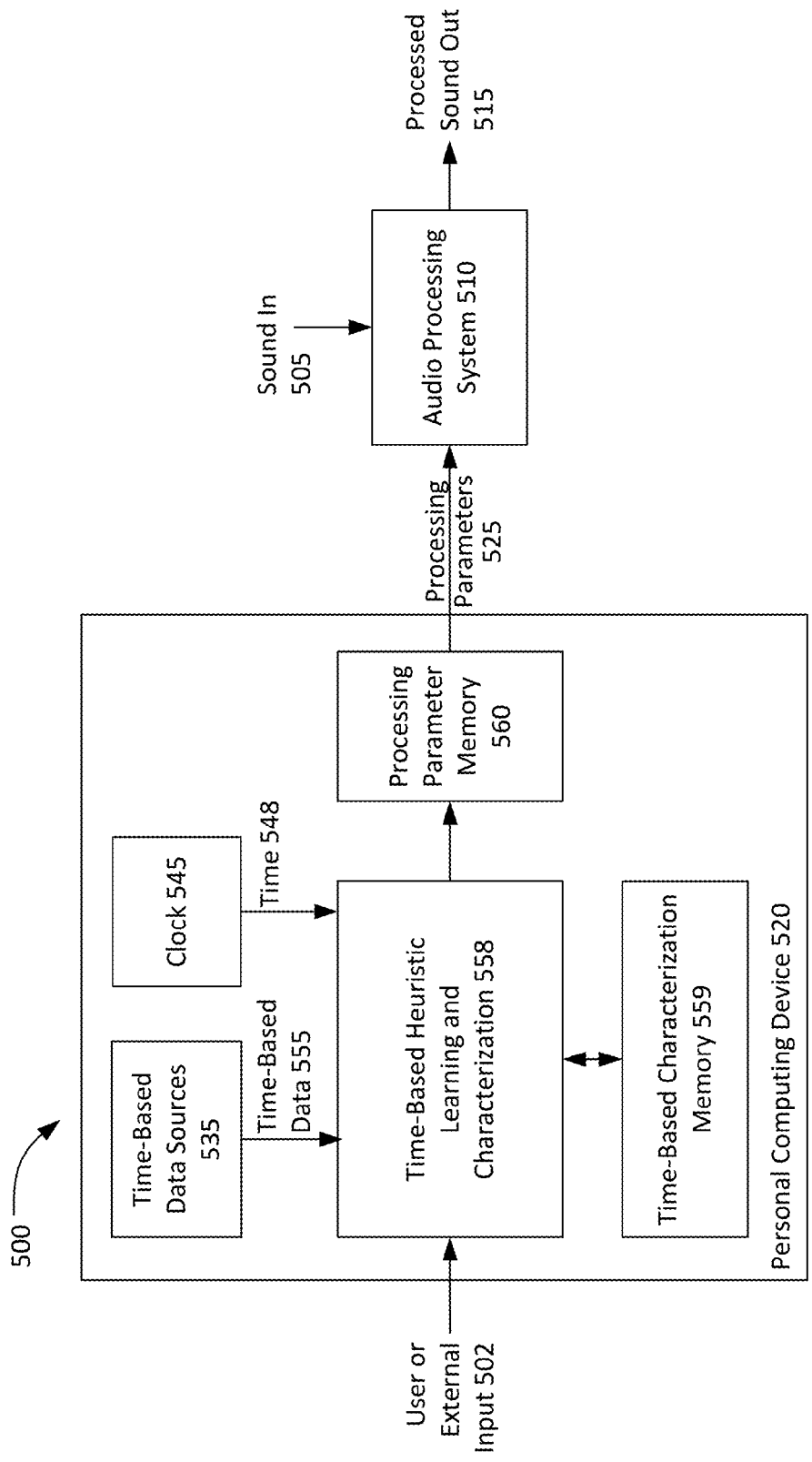
FIG. 5 is a functional block diagram of a time heuristic audio system.

Next, FIG. 5 shows a functional block diagram of a time heuristic audio system 500. The system 500 is shown in functional blocks which may or may not conform to individual elements of physical hardware. The system 500 is made up of the audio processing system 510 and the personal computing device 520. While shown as distinct from one another, depending on the implementation, some or all aspects of the personal computing device 520 may be implemented within the audio processing system 510. Some or all of elements of the functional block diagram may be encompassed within the audio processing system 110 or within the personal computing device 120. That is to say, the functions and processing described with reference to FIG. 5 may take place in whole or in part in one or both of these devices, with the final sound being delivered to one or more speakers within the audio processing system 110.

The personal computing device 520, which may be personal computing device 120, includes time-based data sources 535, a clock 545, a time-based heuristic learning and characterization function 558, a time-based characterization memory 559, and a processing parameter memory 560. The audio processing system 510, which may be audio processing function 110, processes ambient and/or secondary audio as directed by processing parameters used to guide that processing.

The user or external input 502 is manual or selected data identifying a particular one or more processing parameters to be used by the audio processing system 510. The time-based heuristic learning and characterization function 558 is a function for both learning processing parameters associated with particular time-based data 555 and for instructing the audio processing system 510 to use those learned processing parameters when processing audio.

The time-based data sources 535 are sources from which time-based data 555 is drawn. Examples of time-based data sources 535 include calendars, text messaging clients and email clients on the personal computing device 520. Other time-based data sources 535 may include cloud-based sources such as email accounts with data stored on the web, web-accessible calendars, websites, and remotely-stored documents that include time-based data 555.

Time-based data sources 535 include other sources of time-based data 555 such as documents or hyperlinks included with emails, text messages, or instant messages. The time-based data 555, such as a portable document format (PDF) ticket attached to an email or an embedded hyperlink in an email, may indicate the time of an event so that the system may be aware of the user's presence at the event. Further, the PDF may also include information pertaining to a particular artist or series of artists appearing at, for example, a concert. Or, the PDF may include information indicating the name of a stadium or venue where a sporting event or performance is taking place. Still further alternatively, the PDF (or other time-based data source 535) may indicate that the user is watching or planning to watch a particular movie (or a particular theater for watching the movie) for which associated processing parameters 525 exist, and that maybe loaded from processing parameter memory 560.

Time-based data sources 535 may include machine learning capabilities such that less-specific cues may be required. For example, a text or instant message on a particular date with the keyword "U2" identifying a popular Irish band of that name or, more specifically, using machine language parsing techniques on a full phrase like "see you at U2 tonight!" may be cross-referenced using Internet data to determine that there is a U2 concert later on the day of receipt of that text or instant message. Thus, from this data, the system may extract time-based data 555 that indicates that a particular individual is likely going to be present at that concert and may adjust audio processing parameters according to that time-based data 555 during the show.

The time-based data sources 535 may generate time-based data 555 that is used in conjunction with the ambient sound characterization function 450 to select relevant processing parameters. For example, time-based data 555 may be used to determine that the system is present at a particular concert with a known start time. However, music may not actually begin exactly at the start time. So, the ambient sound characterization function 450 may be use in conjunction with the time-based data 555 to select processing parameters for the concert, but to await implementation of the concert-based processing parameters until the ambient sound characterization function 450 indicates that music has actually begun. Until music has begun, the system may sit in a wait state using default processing parameters awaiting the commencement of music. This same type of wait state may be used in various types of time-based data awaiting relevant ambient sound characterization by the ambient sound characterization function 450.

Time-based data sources 535 may include other mobile applications operating on the personal computing device 520 that can generate or have access to time-based data 555. For example, a mobile application such as Uber® by which a user requests a ride to a particular location may provide time-based data including a pick-up or drop-off location "pin" that identifies a place and an associated time. Time-based data 555 (and potentially location data) may be drawn from the mobile application to be used by the time-based heuristic learning and characterization function 558 to select relevant processing parameters.

These types of information may be used, for example, by the time-based characterization memory 559 to access parameters in the processing parameter memory 560 associated with a particular artists, event, or venue. In this way, the time-based data 555 may be more than merely a time/location or a time/activity combination, but may further include additional data that is relevant to audio processing parameters. Processing parameters 525 stored in processing parameter memory 560 may be user-set, set by an artist, set by a venue, set by an audio technician for a particular artist, venue, or event, or may be crowd-sourced such that if a sufficient number of users of the system in a location, at a venue, listening to an artist, or viewing a sporting event select a particular set of processing parameters 525 (manually or automatically) the same set of processing parameters 525 may be identified by the time-based characterization memory 559 as associated with the time, event, artist, venue, or location.

The time-based data 555 may be or include the likelihood that a user of the system is sleeping or will be sleeping soon regardless of any particular location. Based upon prior user activity or likely user desires, the system may automatically access processing parameters 525 that lower the overall volume of ambient sound or otherwise cancel ambient sound to aid a user in sleeping or to avoid unwanted external audio that may disturb sleeping patterns. In such a situation, the time based data 555 may be or include a user's prior sleep patterns as input by a user or as determined over time based upon settings of the system or of personal computing devices in communication with the system. For example, a lack of interaction with the system or a personal computing device from certain hours may suggest sleep and, over time, be learned by the system as associated with a typical sleep pattern for the user. Audio processing parameters 525 may be selected accordingly.

Time-based data 555 indicating that a particular artist (or event-type—e.g. football, baseball, hockey, etc.) and at a particular venue or location may indicate to the time-based characterization memory 559 that a particular set of processing parameters 525 should be selected from the processing parameter memory 560. The processing parameter memory 560 may, in part, be or be formed by processing parameters 525 provided by third parties such as concert venues, event management companies, artists, sporting teams and similarly-situated groups for which specific processing parameters 525 may be relevant.

In some cases, these processing parameters 525 may identify one or more secondary feeds such as a live feed from an audio technician's equipment directly to a user's ears (rather than ambient audio for music), a particular audio set for a movie or augmentation of ambient audio for a movie, a sportscaster's live broadcast super-imposed over the ambient sound of a stadium at a sporting event, and other, similar secondary audio sources.

The clock 545 provides the current time 548 on a periodic basis or upon request.

The time-based characterization memory 559 stores data pertaining to user or external input 502 that may be used to guide future automatic selection of processing parameters based upon time-based data 555. The time-based characterization memory 559 may also store the identity, a name for, a memory location of, or other data pertaining to or identifying one or more processing parameters selected in relationship to a particular set of time-based data 555. In this way, over time, the time-based characterization memory 559 may come to store a number of associations between processing parameters and particular sets of time-based data 555.

Further, if multiple processing parameters are identified as relevant based upon a given set of time-based data 555, the system may enable a process of manual interaction with the personal computing device 120 whereby a user can select one or more of those processing parameters for implementation. This process may begin with an audio prompt to a user of the audio processing system 110 that indicates that interaction with the personal computing device 120 is required or, alternatively, may begin with a visual cue on the personal computing device 120. Auditory response or other non-visual responses, such as voice recognition in response to audio identification of associated processing parameters may be available to a user. In this way, a user may hear, for example, the names of processing parameter sets 1, 2, and 3, then speak audibly a selection of 1 and 3, whereby those two sets of processing parameters are selected. Exterior buttons, either on the personal computing device 120 or the audio processing system 110 may be mapped to the selection of particular processing parameters identified audibly. Similarly, specific interactions with exterior buttons, such as double-clicks or short, then long, clicks of a button, may indicate a particular response to the identification of a processing parameter set.

As discussed above, the processing parameter memory stores processing parameters, like processing parameters 525, that instruct an audio processing system 510 in how to process a selected set of ambient and/or secondary audio sources.

As discussed more fully below, the user or external input 502 may be provided to the time-based heuristic learning and characterization function 558 to, at least in part, inform the function 558 in what processing parameters a user desires. This input may, for example, be the manual selection of a pre-determined set of processing parameters, or may be the manual selection of a series of individual processing parameters to, thereby, manually create a set. This user or external input 502 may merely identify a set of processing parameters already stored in the processing parameter memory 560 or may include external input such as an identification of processing parameters provided by a third party as desirable.

This user or external input 502 may be stored by the function 558 in the time-based characteristic memory 559, with the present time 548, as provided by the clock 545, simultaneously noted and stored in the memory 559. In addition, time-based data 555 provided from time-based data sources 535 may also be noted and stored in the memory 559. In this way, details regarding the selected processing parameters, the present time 548, and the associated time-based data 555 (if any) may be simultaneously stored in memory 559 for later use in automatically selecting processing parameters.

The selected processing parameters 525 may be obtained from the processing parameter memory 560 and provided to the audio processing system 510 for operation upon any sources of sound in 505. Once acted upon by the audio processing system 510, using the processing parameters 525, the processed sound out 515 is output by the audio processing system 510.

Once the time-based heuristic learning and characterization function 558 has "learned" some time-based data 555 that is consistently used to select one or more particular sets of processing parameters, user or external input 502 may no longer be required. Instead, time-based data sources 535 may be periodically consulted in conjunction with time 548 from the clock 545 to determine that the time, date and/or day is the same or that user is at the same event, premises, or location where the user manually selected a set of processing parameters as described above. If the time-based data 555 and the time 548 correspond to the prior settings, the time-based heuristic learning and characterization function 558 may refer to the time-based characterization memory 559 to obtain relevant processing parameters associated uniquely with the time-based data 555 and the time 548 from the processing parameter memory 560. Thereafter, these processing parameters 525 may be provided to the audio processing system 510 without any user or external action.

Description of Processes

Figure 6:
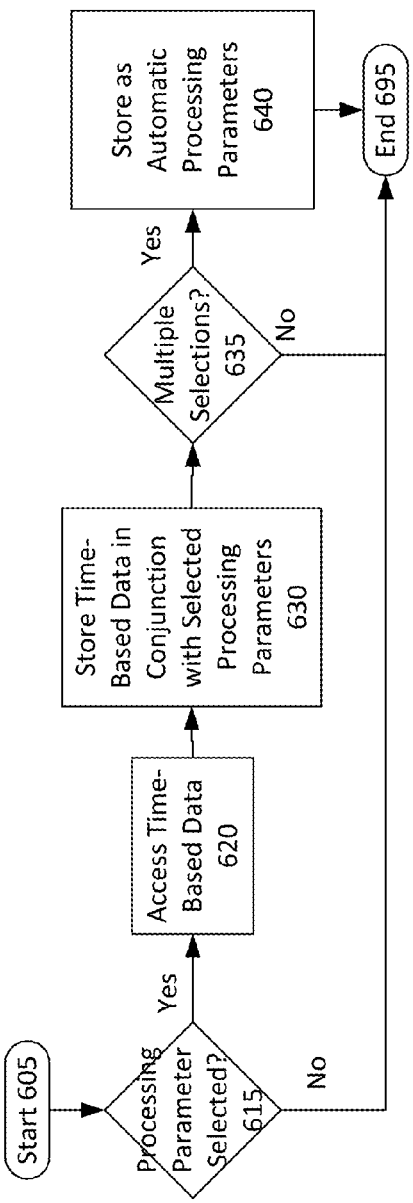
FIG. 6 is a flow chart of a method for creating a time heuristic audio control.

Referring now to FIG. 6, a flow chart of a method 600 for creating a time heuristic audio control is shown. The process begins at 605 and ends at 695. The process 600 may occur many times as user input or other external input altering processing parameters is received. The process 600 results in the storage of the identity of time-based data and associated processing parameters that may be linked so as to be automatically selected at later times when the associated time-based data is received.

After the start 605, a determination is made whether a processing parameter has been selected at 615. If not ("no" at 615), then the process ends at 695.

If so ("yes" at 615), time-based data is accessed at 620. This may be accessing a calendar, email, a short message service, external sources of time-based data such as web-based email, calendars, or similar sources. This may involve determining whether any of the time-based sources indicates that a user of the system is presently at an event, location, or premises or, alternatively, may be a determination of the present time, day, and/or date so that it may, optionally, later be associated with the processing parameter changes that have been made repeatedly.

This time-based data is accessed so that the system may store the time based data in conjunction with the selected processing parameters at 630. This data may be stored, as described briefly above, in the time-based heuristic memory 559 (FIG. 5).

Next, a determination is made, using data stored in the time-based heuristic memory 559, whether there have been multiple selections of the same (or essentially the same) processing parameters when relevant time-based data is present at 635. This determination may merely be comparing a set of parameters to time-based data comprised of the present date/time (e.g. 10:00 am), to the present time and day (e.g. 10:00 am on a Tuesday), to the present time and day and day of the month (e.g. 10:00 am on the second Tuesday of the month), to a specific time and day (e.g. 10:00 am on a holiday morning), or to a specific event, premises, or location identified in time-based data from a time-based data source such as a calendar, email, a text message, or an instant message.

If there are multiple selections of the same processing parameters in conjunction with associated time-based data (e.g. always at 10:00 am on the second Tuesday of the month or always when the user is present in a "meeting" with a certain person), then the processing parameters may be stored as automatic processing parameters to select at 640 when the same time-based data is present in the future. For example, the processing parameters may be selected automatically every 10:00 am on the second Tuesday of the month or when the user is present in a "meeting" with a certain person.

The storage automatic selection of processing parameters at 640 may be relatively sophisticated in that it may store the processing parameters in conjunction with time-based data that is defined as one or more if/then or case statements such that when each element is appropriately met, the automatic selection of processing parameters may take place. Over time, with further refinement, the automatic selection definition may be altered so as to conform to recent changes by a user.

Thereafter, the process ends at 695. Subsequent manual changes or external input of processing parameters may cause the process to begin again as associated new time-based data may be introduced (e.g. another meeting, a different time, a different location) for which other processing parameters may be desired by a user. In effect, this process may occur continuously, with the system continuously monitoring for new time-based data and associated processing parameters that may be "learned" heuristically and stored for later use.

Figure 7:
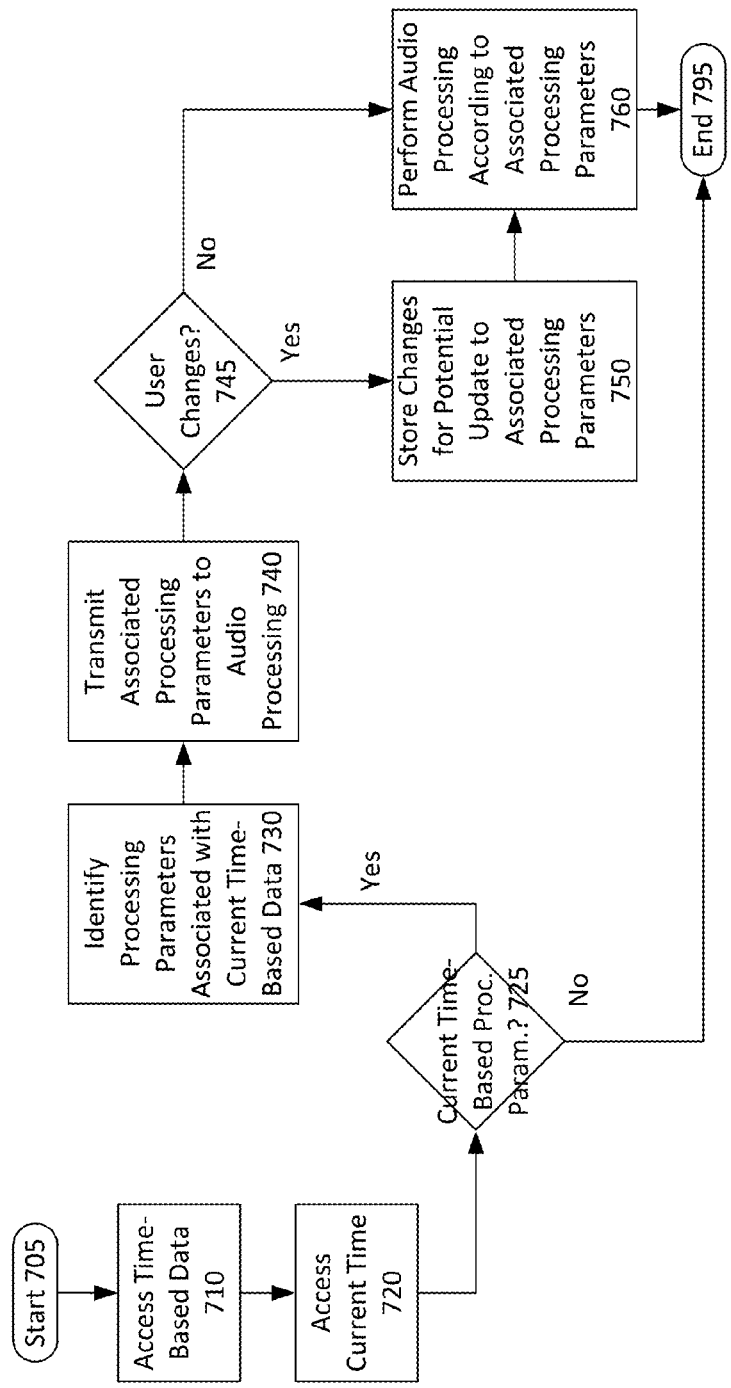
FIG. 7 is a flow chart of a method for altering audio processing parameters in response to a time heuristic audio control.

Referring now to FIG. 7, a flow chart of a method for altering audio processing parameters in response to a time heuristic audio control is shown. The process 700 begins at 705 and ends at 795 once audio processing has begun using selected processing parameters. The process 700 may be initiated periodically or based upon identification of time-based data that may cause a change in the selection of processing parameters.

After the start 705, the time-based data is accessed at 710 by the time heuristic learning and characterization function 558 so that the time-based data may be used to determine if any changes to the processing parameters should be made.

This may be accessing a time-based data source such as a calendar, email, or instant messaging service in order to access or obtain time-based data.

Next, the current time is accessed at 720. This may include accessing the current time, day, date, any holiday data or externally-available data that is not specific to an individual calendar, but is or may be relevant to the time heuristic learning and characterization function 558 in determining whether new processing parameters should be used.

Next, the time heuristic learning and characterization function 558 determines whether there are any current time-based processing parameters at 725. This process entails determining if any of the time-based data accessed at 710 matches the current time accessed at 720 such that new processing parameters should be used for processing ambient and any secondary audio. If not ("no" at 725), then the process ends at 795.

If so ("yes" at 725), then the processing parameters associated with the current time-based data are identified at 730. This may involve accessing the time-based characterization memory 559 to identify the processing parameters associated with the particular time-based data. Then, the processing parameters maybe identified within the processing parameter memory 560 based upon the data in the time-based characterization memory 559.

Once the processing parameters have been identified at 730, they are transmitted to the audio processing system 510 at 740 so that audio processing may begin based upon those processing parameters identified.

The audio processing system 510 and/or the personal computing device 520 may receive user interaction indicating that the user has elected to change the automatically-selected processing parameters at 745. Though shown as immediately following transmission of the processing parameters, the audio processing system 510 may first begin performing audio processing using the parameters and then accept changed processing parameters from a user. However, the option to alter those processing parameters exists from the moment they are automatically selected and transmitted.

If a user makes a change to processing parameters ("yes" at 745), then the changes may be stored in the time-based characterization memory at 750. These changes, particularly if they are made more than one time, may form the basis of updates to the processing parameters associated with a particular set of time-based data.

After any changes are stored at 750, or if no changes are detected ("no" at 745), the audio processing system 510 processes ambient and/or secondary audio sources as directed by the processing parameters selected based upon the time-based data at 760. At any point, a user may manually alter these processing parameters, but, these processing parameters may be automatically selected in response to relevant time-based data as directed by the time heuristic control system.

The process then ends at 795, but may continue to be run periodically or in response to new time-based data indicating that processing parameters should or may change.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A time heuristic audio system, comprising:
   a receiver configured to receive time-based data, the time-based data at least indicating that the time heuristic audio system is scheduled to move to a particular event or a particular location at a predetermined time where the particular event or particular location is expected to have predetermined ambient sound characteristics;
   an audio processing system configured to receive ambient sound and to convert the ambient sound into a digitized ambient sound signal;
   a memory storing one or more sets of processing parameters comprising instructions for processing the digitized ambient sound signal based upon the time-based data; and
   a processor coupled to the memory and the receiver, the processor configured to:
   in response to manually altered processing parameters entered by a user via a user interface, store the time-based data and the manually altered processing parameters together in the memory;
   in the event the time-based data and the manually altered processing parameters are stored together in the memory more than a threshold number of times, update the instructions stored in the memory to retrieve the manually altered processing parameters when the time-based data occurs;
   compare current time data to the time-based data;
   in the event the current time data matches the time-based data and the instructions stored in the memory have been updated, adjust the digitized ambient sound signal according to the manually altered processing parameters stored in the memory to create an adjusted digitized sound signal; and
   in the event the current time data matches the time-based data and the instructions stored in the memory have not been updated, adjust the digitized ambient sound signal as directed by a selected set of processing parameters retrieved from the memory to create the adjusted digitized sound signal, the selected set of processing parameters retrieved based upon the time-based data wherein the audio processing system is configured to convert the adjusted digitized sound signal into adjusted ambient sound for output using at least one speaker.

2. The time heuristic audio system of claim 1 wherein the time-based data is a selected one of: data from a digital calendar indicating that a user is currently present in at a particular location, data comprising the present time in a location, data obtained from a series of past user actions suggesting that the user is taking part in a particular activity, data obtained from an email account suggesting that the user is currently present at a particular location, data obtained from an email account suggesting that the user is currently viewing one of a particular artist, a particular sporting event, a particular activity, or taking part in a particular activity, data from an instant messaging or short message service suggesting that the user is currently present at a particular location, data obtained from an application operating on a personal computing device, and data obtained from an instant messaging or short message service suggesting that the user is currently viewing one of a particular artist, a particular sporting event, a particular activity, or taking part in a particular activity.

3. The time heuristic audio system of claim 2 wherein the time based data is used in conjunction with a secondary source of data comprising one of the Internet, a database, or a data repository available via a network to the processor to select the selected set of processing parameters for retrieval.

4. The time heuristic audio system of claim 1 wherein the digitized ambient sound signal is adjusted based upon the time-based data so as to perform one or more of the following: lower overall volume, increase overall volume, lower relative volume or attenuate the adjusted ambient sound signal within a first predetermined frequency range, raise the relative volume of the adjusted ambient sound signal within a second predetermined frequency, raise relative volume of a nearby sound while lowering the volume of sounds further away, raise the relative volume of a particular sound source, based upon characteristics of the particular sound source which were previously categorized, and raise relative volume of one or more particular sound sources based upon the time-based data indicating that the one or more particular sound sources are taking part in an event involving a user of the time heuristic audio system.

5. The time heuristic audio system of claim 1 wherein:
the one or more sets processing parameters stored in the memory further comprise instructions for processing secondary audio from at least one secondary audio source based upon the time-based data; and
the processor is further configured to adjust the secondary audio as directed by the selected set of processing parameters retrieved from the memory to create adjusted secondary audio and to combine the adjusted secondary audio with the adjusted digitized sound signal.

6. The time heuristic audio system of claim 1 wherein the selected set of processing parameters is automatically selected based upon more than one prior user selection of the selected set of processing parameters when the time-based data indicates that a user of the time heuristic audio system is in the particular location or at the particular event.

7. The time heuristic audio system of claim 6 wherein the processor is further for:

determining, based upon time-based data, that the user is at the particular location or the particular event; and
automatically selecting the stored processing parameters as the selected set of processing parameters.

8. The time heuristic audio system of claim 1 wherein the selected set of processing parameters is automatically selected based upon information provided by a participant in an event identified by the time-based data.

9. The time heuristic audio system of claim 1 wherein the processor is further for:
determining, based upon the time-based data, that the user is at the particular location or the particular event and that the user has selected the selected set of processing parameters for at least a second time; and
storing the selected set of processing parameters as stored processing parameters to be automatically selected when time-based data received later indicates that the user is at the particular location or the particular event.

10. The time heuristic audio system of claim 1 further comprising a personal computing device, coupled to the processor via a wireless communication link.

11. The time heuristic audio system of claim 10 wherein the personal computing device operates as a source of the time-based data, the personal computing device comprising:
a second memory storing at least one time-based data source; and
a transmitter for transmitting the time-based data to the receiver.

12. The time heuristic audio system of claim 1, wherein the audio processing system comprises:
a housing enclosing at least a portion of the processor and at least a portion of the memory;
at least one microphone for receiving the ambient sound, converting the ambient sound into electrical signals, and for providing the ambient sound in the form of the electrical signals to a preamplifier;
the preamplifier coupled to an analog to digital converter and the analog to digital converter configured to convert the ambient sound into the digitized ambient sound signal for operation by the processor; and
a digital to analog converter, an amplifier, and the at least one speaker to convert the adjusted digitized sound signal from the processor into the adjusted ambient sound, wherein
the at least one microphone, the preamplifier, the analog to digital converter, the digital to analog converter, the amplifier, and the at least one speaker are disposed within the housing.

13. The time heuristic audio system of claim 12 wherein the housing is an earbud housing configured to fit, at least partially, within and be supported by a user's ear.

14. The time heuristic audio system of claim 1 wherein the time-based data is used in conjunction with ambient sound characterization performed by the time heuristic audio system to identify when the selected set of processing parameters should begin being used to process the digitized ambient sound signal so as to derive the adjusted ambient sound.

15. A method for time heuristic audio control, comprising:
storing in a memory one or more sets processing parameters comprising instructions for processing the ambient sound based upon received time-based data;
receiving time-based data at a receiver, the time-based data indicating that a user is scheduled to move to a particular event or a particular location where the particular event or particular location is expected to have predetermined ambient sound characteristics;

receiving ambient sound and converting the ambient sound into a digitized ambient sound signal;

in response to manually altered processing parameters entered by a user via a user interface, storing the time-based data and the manually altered processing parameters together in the memory;

in the event the time-based data and the manually altered processing parameters are stored together in the memory more than a threshold number of times, updating the instructions stored in the memory to retrieve the manually altered processing parameters when the time-based data occurs;

comparing current time data to the time-based data;

in the event the current time data matches the time-based data and the instructions stored in the memory have been updated, adjusting, by a processor, the digitized ambient sound signal according to the manually altered processing parameters stored in the memory to create an adjusted digitized sound signal;

in the event the current time data matches the time-based data and the instructions stored in the memory have not been updated, adjusting, by the processor, the digitized ambient sound signal as directed by a selected set of processing parameters retrieved from the memory to create the adjusted digitized sound signal, the selected set of processing parameters selected based upon the time-based data;

converting the adjusted digitized sound signal into adjusted ambient sound; and outputting the adjusted ambient sound using at least one speaker.

16. The method of claim 15 wherein the time-based data is a selected one of: data from a digital calendar indicating that a user is currently present in at a particular location, data comprising a present time in a location, data obtained from a series of past user actions suggesting that the user is taking part in a particular activity, data obtained from an email account suggesting that the user is currently present at a particular location, data obtained from an email account suggesting that the user is currently viewing one of a particular artist, a particular sporting event, a particular activity, or taking part in a particular activity, data from an instant messaging or short message service suggesting that the user is currently present at a particular location, data obtained from an application operating on a personal computing device, and data obtained from an instant messaging or short message service suggesting that the user is currently viewing one of a particular artist, a particular sporting event, a particular activity, or taking part in a particular activity.

17. The method of claim 16 wherein the time based data is used in conjunction with a secondary source of data comprising one of the Internet, a database, or a data repository available via a network to the processor to select the selected set of processing parameters for retrieval.

18. The method of claim 15 wherein the digitized ambient sound signal is adjusted based upon the time-based data so as to perform one or more of the following: lower overall volume, increase overall volume, lower relative volume or attenuate the ambient sound within a first predetermined frequency range, raise the relative volume of the ambient sound within a second predetermined frequency, raise the relative volume of a nearby sound while lowering the volume of sounds further away, raise relative volume of a particular sound source, based upon characteristics of the particular sound source which were previously categorized, and raise relative volume of one or more particular sound sources based upon the time-based data indicating that the one or more particular sound sources are taking part in an event involving a user of the system.

19. The method of claim 15 wherein:
the one or more sets comprise instructions for processing secondary audio from at least one secondary audio source based upon the time-based data; and
the secondary audio is adjusted as directed by the selected set of processing parameters retrieved from the memory and combined with the adjusted digitized sound signal.

20. The method of claim 15 wherein the selected set of processing parameters is automatically selected based upon more than one prior user selection of the selected set of processing parameters when the time-based data indicates that a user of a time heuristic audio system used in the particular location or at the particular event.

21. The method of claim 15 wherein the selected set of processing parameters is automatically selected based upon information provided by a participant in an event identified by the time-based data.

22. The method of claim 15 further comprising:
determining, based upon the time-based data, that the user is at the particular location or the particular event and that the user has selected the selected set of processing parameters for at least a second time; and
storing the selected set of processing parameters as stored processing parameters to be automatically selected when time-based data received later indicates that the user is at the particular location or the particular event.

23. The method of claim 22 further comprising:
determining, based upon time-based data, that the user is at the particular location or the particular event; and
automatically selecting the stored processing parameters as the selected set of processing parameters.

24. The method of claim 15 wherein a personal computing device operates as a source of the time-based data, the personal computing device for:
storing at least one time-based data source; and
transmitting the time-based data for reception by the receiver.

25. The method of claim 15 further comprising:
performing ambient sound characterization; and
using the time-based data in conjunction with the ambient sound characterization to identify when the selected set of processing parameters should begin being used to process the ambient sound so as to generate the adjusted ambient sound for output.

\* \* \* \* \*